US012559638B2

(12) United States Patent
Nakanishi

(10) Patent No.: US 12,559,638 B2
(45) **Date of Patent: *Feb. 24, 2026**

(54) INKJET INK AND INKJET RECORDING APPARATUS

(71) Applicant: KYOCERA Document Solutions Inc., Osaka (JP)

(72) Inventor: Arisa Nakanishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 226 days.

This patent is subject to a terminal disclaimer.

(21) Appl. No.: 18/517,614

(22) Filed: Nov. 22, 2023

(65) Prior Publication Data

US 2024/0182732 A1 Jun. 6, 2024

(30) Foreign Application Priority Data

Nov. 30, 2022 (JP) ................................ 2022-191469

(51) Int. Cl.
*C09D 11/322* (2014.01)
*B41J 2/01* (2006.01)
(Continued)

(52) U.S. Cl.
CPC ............... *C09D 11/322* (2013.01); *B41J 2/01* (2013.01); *B41J 2/21* (2013.01); *B41J 2/2107* (2013.01); *C09D 11/38* (2013.01)

(58) Field of Classification Search
CPC ......... C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045;
(Continued)

(56) References Cited

U.S. PATENT DOCUMENTS 3,386,843 A * 6/1968 Jaffe ...................... C09B 48/00 106/419
6,152,968 A * 11/2000 Etzbach ............... C09D 11/328 564/57

(Continued)

FOREIGN PATENT DOCUMENTS

JP 2000-273383 A 10/2000

*Primary Examiner* — Manish S Shah
(74) *Attorney, Agent, or Firm* — Stein IP, LLC

(57) ABSTRACT

An inkjet ink contains quinacridone pigment and aqueous medium. A sulfur concentration in the 10-fold diluent of supernatant liquid obtained by centrifuging the inkjet ink at 1,050,000 G for three hours is 1.0 ppm or more and 6.0 ppm or less. In an ultraviolet and visible ray absorption spectrum of the 25-fold diluent of the supernatant liquid, light absorbance at a predetermined peak is 0.17 or less. The predetermined peak is a maximum peak in a wavelength range of 400 nm or more and 490 nm or less.

9 Claims, 3 Drawing Sheets

(51) Int. Cl.
*B41J 2/21* (2006.01)
*C09D 11/38* (2014.01)

(58) Field of Classification Search
CPC .. B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 2008/0314285 | A1* | 12/2008 | Deroover | C09D 11/101 106/31.77 |
| 2012/0140001 | A1* | 6/2012 | Birau | C09D 11/322 106/31.77 |
| 2021/0155815 | A1* | 5/2021 | Vasudevan | C09D 11/326 |
| 2021/0189160 | A1* | 6/2021 | Vasudevan | C09D 11/033 |
| 2024/0026173 | A1* | 1/2024 | Ishida | B41J 2/2146 |
| 2024/0026174 | A1* | 1/2024 | Ozawa | B41J 2/2146 |

* cited by examiner

INKJET INK AND INKJET RECORDING APPARATUS

INCORPORATION BY REFERENCE

This application is based upon and claims the benefit of priority from the corresponding Japanese Patent Application No. 2022-191469 filed Nov. 30, 2022, the entire contents of which are hereby incorporated by reference.

BACKGROUND

The present disclosure relates to an inkjet ink and an inkjet recording apparatus.

The inkjet recording apparatus is equipped with a recording head, which ejects inkjet ink. The inkjet ink is required to have ejection stability from the recording head.

SUMMARY

The inkjet ink according to the present disclosure contains quinacridone pigment and aqueous medium. A sulfur concentration of the 10-fold diluent of supernatant liquid obtained by centrifuging the inkjet ink at 1,050,000 G for three hours is 1.0 ppm or more and 6.0 ppm or less. In an ultraviolet and visible ray absorption spectrum of 25-fold diluent of the supernatant liquid, light absorbance at a predetermined peak is 0.17 or less. The predetermined peak is a maximum peak in a wavelength range of 400 nm or more and 490 nm or less.

Other objects of the present disclosure and specific advantages obtained by the present disclosure will become more apparent from the description of the embodiment given below.

DETAILED DESCRIPTION

Figure 1:
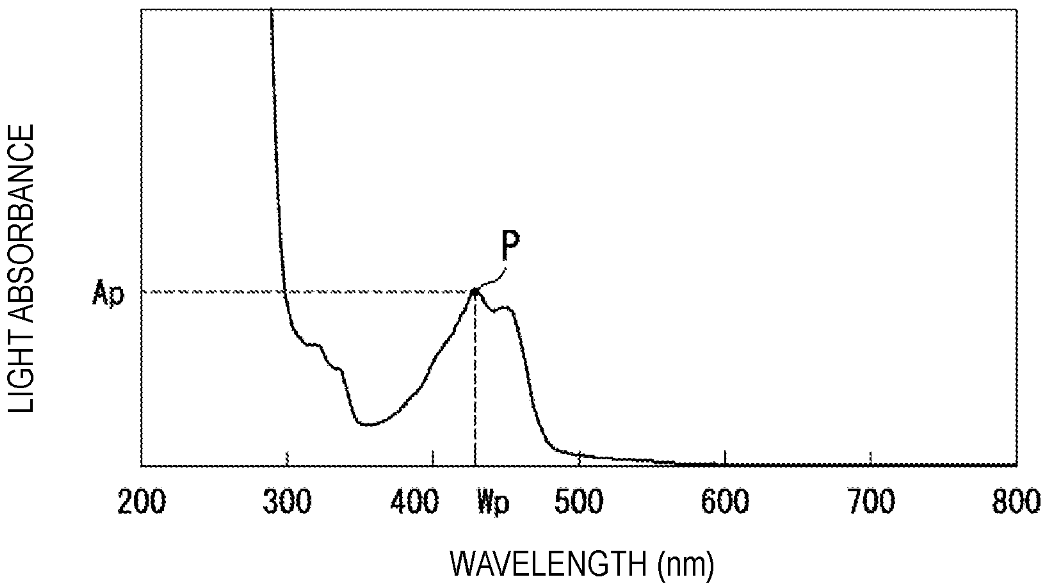
FIG. 1 is a diagram illustrating an example of an ultraviolet and visible ray absorption spectrum of 25-fold diluent of supernatant liquid.

Hereinafter, an embodiment of the present disclosure is described. First, terms used in this specification is explained. A volume median diameter ($D_{50}$) is a value measured by a dynamic light scattering type particle size distribution analyzer ("Zetasizer Nano ZS" manufactured by Spectris Co., Ltd.) unless otherwise noted. An acid number is a value measured according to "JIS (Japanese Industrial Standard) K0070:1992" unless otherwise noted. A mass average molecular weight (Mw) is a value measured using a gel permeation chromatography unless otherwise noted. In this specification, "acryl" and "methacryl" may be generically referred to as "(meth)acryl". In description of formula, "each independently" means it may represent the same group or may represent different groups. Components described in this specification may be one type used alone or may be two or more types used in combination. Thus, the terms used in this specification are described above.

Next, an example of conventional art and a problem thereof are described. As an example of conventional art, there is inkjet recording liquid containing an aqueous pigment dispersing element. This aqueous pigment dispersing element contains aqueous liquid, quinacridone pigment particles dispersed in the aqueous liquid, water-soluble quinacridone derivative absorbed on surfaces of the quinacridone pigment particles, and unabsorbed water-soluble quinacridone derivative. However, this conventional inkjet recording liquid is insufficient for suppressing occurrence of ejection displacement from a recording head of the inkjet recording apparatus, and for dispersion stability.

The present disclosure is made in view of the problem described above, and its object is to provide inkjet ink that can suppress occurrence of ejection displacement from the recording head and has good dispersion stability, and to provide an inkjet recording apparatus using the inkjet ink.

First Embodiment

InkJet Ink

Hereinafter, inkjet ink of a first embodiment of the present disclosure (hereinafter, may be referred to simply as ink) is described.

The ink of the first embodiment contains quinacridone pigment and aqueous medium. A sulfur concentration of the 10-fold diluent of supernatant liquid obtained by centrifuging the ink at 1,050,000 G for three hours is 1.0 ppm or more and 6.0 ppm or less. In an ultraviolet and visible ray absorption spectrum of 25-fold diluent of the supernatant liquid obtained by centrifuging the ink at 1,050,000 G for three hours, light absorbance at a predetermined peak is 0.17 or less. The predetermined peak is a maximum peak in a wavelength range of 400 nm or more and 490 nm or less.

Hereinafter, the "supernatant liquid obtained by centrifuging the ink at 1,050,000 G for three hours" may be referred to simply as "supernatant liquid". In addition, the "sulfur concentration of the 10-fold diluent of supernatant liquid obtained by centrifuging the ink at 1,050,000 G for three hours" may be referred to simply as a "predetermined sulfur concentration". The "light absorbance at the predetermined peak in the ultraviolet and visible ray absorption spectrum of 25-fold diluent of the supernatant liquid obtained by centrifuging the ink at 1,050,000 G for three hours" may be referred to as a "predetermined light absorbance". In this specification, the "predetermined peak" is defined as a "maximum peak in a wavelength range of 400 nm or more and 490 nm or less in the ultraviolet and visible ray absorption spectrum".

The ink of the first embodiment, which has the structure described above, can suppress occurrence of ejection displacement of ink from the recording head, and has good dispersion stability. The reason is considered as follows.

First, to assist understanding, a general outline of a method for synthesizing quinacridone pigment is described. The quinacridone pigment is a compound expressed by formula (D), for example. The quinacridone pigment is synthesized by carrying out the reactions expressed by the reaction formulas (r-a), (r-b), and (r-c), for example.

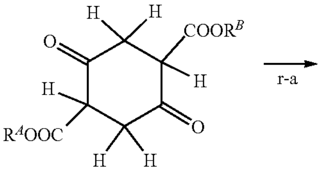

(A)

-continued

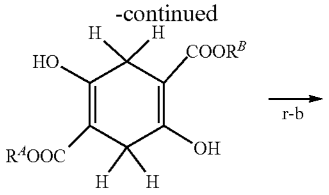

(B)

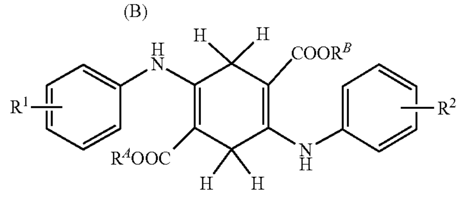

(C)

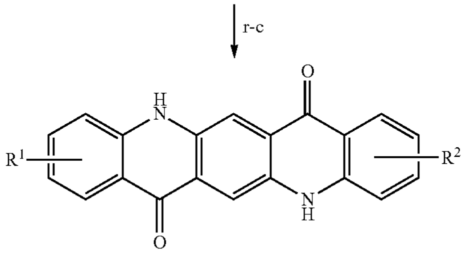

(D)

$R^A$, $R^B$, $R^1$, and $R^2$ in formulas (A), (B), (C), and (D) each independently represent a monovalent group. Hereinafter, the "reactions expressed by the reaction formulas (r-a), (r-b), and (r-c)" may be referred to as "reactions (r-a), (r-b), and (r-c)", respectively. In addition, the "compounds expressed by formulas (A), (B), (C), and (D)" may be referred to as "compounds (A), (B), (C), and (D)", respectively. If $R^1$ and $R^2$ each represent a methyl group, the compound (D) is C.I. Pigment Red 122. If $R^1$ and $R^2$ each represent a hydrogen atom, the compound (D) is C.I. Pigment Violet 19. In the process of carrying out the reactions (r-a), (r-b), and (r-c), compounds (B) and (C) as synthetic intermediates are generated. Thus, the general outline of the method for synthesizing the quinacridone pigment is described above.

The synthetic intermediates generated in the process of carrying out the reactions (r-a), (r-b), and (r-c) (more specifically, the compounds (B) and (C)) may remain as impurities in the quinacridone pigment. When this quinacridone pigment is contained in the ink, the ink also contains the synthetic intermediates. The polarity of the synthetic intermediate is relatively high. Therefore, if the ink containing the quinacridone pigment is used for forming an image, the synthetic intermediates may be electrostatically adhered to an ejection face and a nozzle hole inner wall of the recording head. When the ink is dried and thickened, the adhered synthetic intermediates become an aggregation, which causes the ejection displacement of ink from the recording head. Therefore, in the ink of the first embodiment, the predetermined light absorbance is set to 0.17 or less. The predetermined peak is a peak derived from the synthetic intermediates of the quinacridone pigment (more specifically, compounds (B) and (C)), for example. If the predetermined light absorbance is 0.17 or less, there are relatively little synthetic intermediates as impurities, and hence occurrence of the ejection displacement of ink from the recording head can be suppressed.

In addition, the quinacridone pigment is hardly dispersed in an aqueous medium, and hence quinacridone derivative containing sulfur atoms as a dispersing agent may be added to the quinacridone pigment. Hereinafter, "quinacridone derivative containing sulfur atoms" may be referred to as "sulfur containing pigment derivative". When the quinacridone pigment to which the sulfur containing pigment derivative is added is contained in the ink, the ink also contains the sulfur containing pigment derivative. Polarity of the sulfur containing pigment derivative is relatively high. Therefore, when the ink containing the quinacridone pigment is used to form an image, the sulfur containing pigment derivative may be electrostatically adhered to the ejection face or the nozzle hole inner wall of the recording head. When the ink is dried and thickened, the adhered sulfur containing pigment derivative becomes an aggregation, which causes the ejection displacement of ink from the recording head. Therefore, in the ink of the first embodiment, the predetermined sulfur concentration is set to 6.0 ppm or less. If the predetermined sulfur concentration is 6.0 ppm or less, there is relatively little sulfur containing pigment derivative, and hence occurrence of the ejection displacement of ink from the recording head can be suppressed.

In addition, in the ink of the first embodiment, the predetermined sulfur concentration is set to 1.0 ppm or more. The ink, in which the predetermined sulfur concentration is 1.0 ppm or more, contains sufficient amount of the sulfur containing pigment derivative as the dispersing agent. Therefore, the dispersed particle size of the pigment particles containing the quinacridone pigment becomes small, and the pigment particles are hardly precipitated. As a result, the dispersion stability of the ink is improved.

Thus, the reason why the ink of the first embodiment can suppress occurrence of the ejection displacement of ink from the recording head and can have good dispersion stability is described above. Hereinafter, the ink of the first embodiment is further described in detail.

<Predetermined Light Absorbance>

Hereinafter, with reference to FIG. 1, a method of determining the predetermined light absorbance is described. FIG. 1 is a diagram illustrating the ultraviolet and visible ray absorption spectrum of the 25-fold diluent obtained by diluting the supernatant liquid, which is obtained by centrifuging reference ink at 1,050,000 G for three hours, by 25 times with water. Note that the reference ink is different from ink of Example and Comparative Example described later, and is shown as an example for describing the method of determining the predetermined light absorbance. This reference ink contains at least the quinacridone pigment (more specifically, C.I. Pigment Red 122), sulfur containing pigment derivative (1-1) described later, and aqueous medium. In FIG. 1, the vertical axis indicates the light absorbance, and the horizontal axis indicates the wavelength (nm).

In FIG. 1, the predetermined peak P is a maximum peak in the wavelength range of 400 nm or more and 490 nm or less. The maximum peak is a peak having a maximum light absorbance among peaks (i.e., apexes) of convex curves of the spectrum in the wavelength range of 400 nm or more and 490 nm or less.

In the spectrum illustrated in FIG. 1, the predetermined peak P having the maximum light absorbance is determined among peaks in the wavelength range of 400 nm or more and 490 nm or less. Then, from the spectrum illustrated in FIG. 1, wavelength Wp (nm) and light absorbance Ap at the predetermined peak P of the 25-fold diluent of the supernatant liquid are read. The read light absorbance Ap at the predetermined peak P of the 25-fold diluent of the supernatant liquid is the light absorbance at the predetermined peak in the ultraviolet and visible ray absorption spectrum of the 25-fold diluent of the supernatant liquid (i.e., the predetermined light absorbance). Note that in the example illustrated in FIG. 1, among peaks of the spectrum in the wavelength range of 400 nm or more and 490 nm or less, the wavelength Wp at the predetermined peak P having the maximum light absorbance is identified to be 429 nm.

Thus, with reference to FIG. 1, the method of determining the predetermined light absorbance is described above. Hereinafter, the predetermined light absorbance is further described.

As already described above, the predetermined light absorbance is 0.17 or less. The predetermined light absorbance is 0.05 or more, for example, though the lower limit thereof is not particularly limited.

The predetermined peak of the 25-fold diluent of the supernatant liquid is, for example, a peak derived from the synthetic intermediates of the quinacridone pigment remaining in the quinacridone pigment. Therefore, the predetermined light absorbance can be adjusted, for example, by changing amount of the synthetic intermediates remaining in the quinacridone pigment contained in the ink. The amount of the synthetic intermediates can be changed, for example, by changing the number of pass times of activated carbon treatment of pigment dispersion liquid in the activated carbon treatment described later. There is a tendency that the predetermined light absorbance becomes smaller, as the number of pass times of activated carbon treatment of the pigment dispersion liquid is larger, so that the synthetic intermediates are removed at least partially.

As the synthetic intermediates of the quinacridone pigment for synthesizing the quinacridone pigment, there is, for example, the compound expressed by formula (2) (hereinafter, may be referred to as compound (2)). The predetermined peak of the 25-fold diluent of the supernatant liquid is, for example, a peak derived from the compound (2) contained in the ink.

(2)

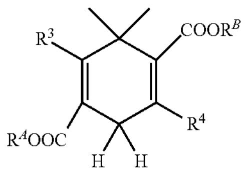

In the formula (2), $R^A$ and $R^B$ each independently represent a monovalent group. $R^3$ represents a hydroxy group or the group expressed by formula (3). $R^4$ represents a hydroxy group or the group expressed by formula (4).

(3)

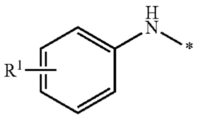

(4)

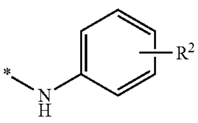

In the formulas (3) and (4), $R^1$ and $R^2$ each independently represent a monovalent group. The symbol * in the formula (3) represents that it is bounded to a carbon atom to which $R^3$ in the formula (2) is bonded. The symbol * in the formula (4) represents that it is bounded to a carbon atom to which $R^4$ in the formula (2) is bonded.

As the compound (2), there are, for example, the compounds (B) and (C) that are already described.

As the monovalent groups represented by $R^A$ and $R^B$ in the formula (2), and formulas (A), (B), and (C) that are already described, there are, for example, an alkyl group and an aryl group. The monovalent groups represented by $R^A$ and $R^B$ are each preferably an alkyl group, and more preferably an alkyl group having a number of carbon atoms of 1 or more and 6 or less, and still more preferably an ethyl group.

As the monovalent groups represented by $R^1$ and $R^2$ in the formulas (3) and (4), and formulas (C), and (D) that are already described, there are, for example, a hydrogen atom, an alkyl group, and a halogen atom. The halogen atoms represented by $R^1$ and $R^2$ are each preferably a chlorine atom. The alkyl groups represented by $R^1$ and $R^2$ are each preferably an alkyl group having a number of carbon atoms of 1 or more and 6 or less, and more preferably a methyl group. $R^1$ and $R^2$ each preferably represent a hydrogen atom. In addition, it is also preferred that $R^1$ and $R^2$ each represent a methyl group.

<Quinacridone Pigment>

The ink contains quinacridone pigment. As the quinacridone pigment, there are, for example, C.I. Pigment Violet (19 and 42), C.I. Pigment Red (122, 202, 206, 207, and 209), and C.I. Pigment orange (48 and 49). As a crystal form of the quinacridone pigment, there are, for example, an α-type, a γ-type, and a β-type. For stabilization of crystal of quinacridone pigment, the quinacridone pigment is preferably the γ-type or the β-type. The quinacridone pigment does not need to have sulfur atoms unlike the sulfur containing pigment derivative.

As the quinacridone pigment usable and available on the market, for example, there are "RED63" produced by Dainichiseika Color & Chemicals Mfg. Co., Ltd., "TRM-11" produced by Dainichiseika Color & Chemicals Mfg. Co., Ltd., "Cinquasia (registered trademark) Magenta D4550" produced by BASF Company, "Cinquasia® Pink D4450" produced by BASF Company, "Inkjet Magenta E-S" produced by Clariant AG, "HOSTAPERM PINK E 02" produced by Clariant AG, "HOSTAPERM RED E3B" produced by Clariant AG, and "HOSTAPERM RED E5B 02" produced by Clariant AG.

As the predetermined sulfur concentration can be easily adjusted within a predetermined range, the content percentage of the quinacridone pigment with respect to the total weight of the quinacridone pigment and the sulfur containing pigment derivative is preferably 88 weight percent or more and 96 weight percent or less.

The content percentage of the quinacridone pigment in the ink is preferably 1 weight percent or more and 12 weight percent or less, and more preferably 4 weight percent or more and 8 weight percent or less. By setting the content percentage of the quinacridone pigment to be 1 weight percent or more, an image having a desired image density can be formed using the ink. By setting the content percentage of the quinacridone pigment to be 12 weight percent or less, flowability of the ink can be optimized. The ink may contain only the quinacridone pigment as the pigments. Alternatively, in order to adjust the hue of the ink, the ink may further contain, in addition to the quinacridone pigment, other pigment, as the pigments. The content percentage of the quinacridone pigment in the pigments is preferably 80 weight percent or more, and more preferably 90 weight percent or more, and particularly preferably 100 weight percent. The total content percentage of the quinacridone pigment and the sulfur containing pigment derivative in the ink is preferably 1 weight percent or more and 12 weight percent or less, and more preferably 4 weight percent or more and 8 weight percent or less.

<Sulfur Containing Pigment Derivative>

It is preferred that the ink further contain the sulfur containing pigment derivative (i.e., the quinacridone derivative containing sulfur atoms). The sulfur containing pigment derivative is at least partially absorbed by the quinacridone pigment. The quinacridone pigment is hydrophobic, and the sulfur containing pigment derivative is hydrophilic. Therefore, when the sulfur containing pigment derivative is absorbed by the quinacridone pigment, the quinacridone pigment is properly dispersed in the aqueous medium. It is preferred that the quinacridone pigment be water-insoluble and that the sulfur containing pigment derivative be water-soluble. The sulfur containing pigment derivative may be partially free in the aqueous medium.

The predetermined sulfur concentration corresponds to concentration of sulfur atoms of the sulfur containing pigment derivative in the 25-fold diluent of the supernatant liquid. In other words, the predetermined sulfur concentration is the concentration of sulfur atoms of the sulfur containing pigment derivative contained in the 25-fold diluent of the supernatant liquid. The predetermined sulfur concentration is derived from, for example, sulfur atoms of the sulfur containing pigment derivative contained in the ink.

As already described above, the predetermined sulfur concentration is 1.0 ppm or more and 6.0 ppm or less. In order to allow the quinacridone pigment to be further properly dispersed in the aqueous medium, the predetermined sulfur concentration is preferably 1.5 ppm or more, and more preferably 2.0 ppm or more, and still more preferably 3.0 ppm or more, and still more preferably 5.0 ppm or more. On the other hand, in order to further suppress occurrence of the ejection displacement of ink from the recording head, the predetermined sulfur concentration is preferably 5.0 ppm or less, and more preferably 3.0 ppm or less, and still more preferably 2.0 ppm or less, and still more preferably 1.5 ppm or less.

For instance, by changing the content percentage of the sulfur containing pigment derivative with respect to the total weight of the quinacridone pigment and the sulfur containing pigment derivative, the predetermined sulfur concentration can be adjusted. There is a tendency that the predetermined sulfur concentration is smaller as the content percentage of the sulfur containing pigment derivative is smaller. For instance, in the process A and the process B described later for synthesizing the quinacridone pigment, by changing amount of the sulfur containing pigment derivative to be added, the predetermined sulfur concentration can be adjusted. When using commercially available quinacridone pigment, by selecting a production lot having the desired content percentage of the sulfur containing pigment derivative, the predetermined sulfur concentration can be adjusted. In addition, by changing a discharge rate of a wet disperser in a preparation process of the pigment dispersion liquid described later, the predetermined sulfur concentration can be adjusted. For instance, the predetermined sulfur concentration is measured by the method described in Example.

The sulfur containing pigment derivative has a sulfur-containing group, for example. As the sulfur-containing group, there are, for example, a sulfo group, a sulfino group, a sulfeno group, a thiocarboxyl group, a dithiocarboxy group, and a sulfide group. The sulfur containing pigment derivative is a compound in which a hydrogen atom of the quinacridone pigment exemplified in the above description is replaced by the sulfur-containing group, for example.

The sulfur containing pigment derivative is preferably a metallic salt. If the sulfur containing pigment derivative is a metallic salt, compatibility of the sulfur containing pigment derivative with the aqueous medium is enhanced. As a result, the quinacridone pigment that has absorbed the sulfur containing pigment derivative is properly dispersed in the aqueous medium. The sulfur containing pigment derivative as the metallic salt is preferably the compound expressed by the formula (1) (hereinafter, may be referred to as a sulfur containing pigment derivative (1)).

(1)

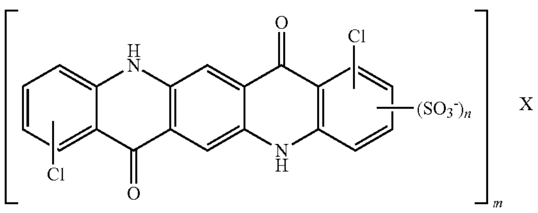

In the formula (1), n represents an integer of 1 or more and 3 or less, m represents an integer of 1 or more and 3 or less, X represents a metallic ion.

In the formula (1), n preferably represents 2 or 3. It is preferred that m represents 1. In the formula (1), X preferably represents one or more and three or less valent metallic ion, and more preferably bivalent or trivalent metallic ion, and still more preferably $Al^{3+}$ or $Mg^{2+}$.

As the sulfur containing pigment derivative (1), there are, for example, compounds expressed by formulas (1-1) and (1-2) (hereinafter, may be referred to as sulfur containing pigment derivatives (1-1) and (1-2), respectively). Note that in the formulas (1-1) and (1-2), m represents 1 but is omitted.

(1-1)

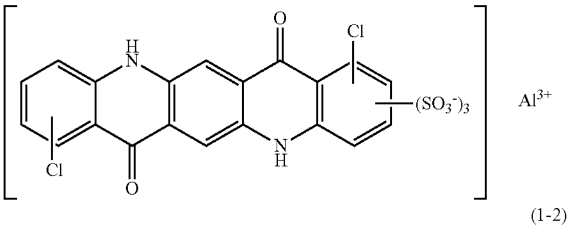

(1-2)

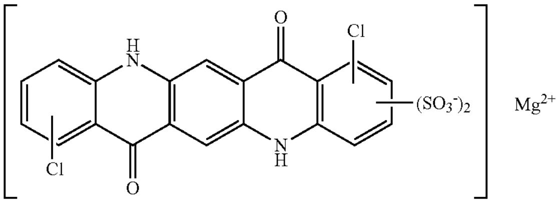

The content percentage of the sulfur containing pigment derivative with respect to the total weight of the quinacridone pigment and the sulfur containing pigment derivative is preferably 4 weight percent or more and 12 weight percent or less, and more preferably 5 weight percent or more and 10 weight percent or less. If the content percentage of the sulfur containing pigment derivative is 4 weight percent or more and 12 weight percent or less, the predetermined sulfur concentration can be easily adjusted within a predetermined range. There is a tendency that the predetermined sulfur concentration becomes lower as the content percentage of the sulfur containing pigment derivative becomes lower.

The content percentage of the sulfur containing pigment derivative in the ink is preferably 0.01 weight percent or more and 2.00 weight percent or less, and more preferably 0.20 weight percent or more and 0.75 weight percent or less.

<Pigment Dispersion Resin>

It is preferred that the ink further contains the pigment dispersion resin. The pigment dispersion resin contains the absorbed resin and the unabsorbed resin. The absorbed resin is absorbed by the quinacridone pigment. The quinacridone pigment forms the pigment particles together with the absorbed resin, for example. For instance, the pigment particle has a core containing the quinacridone pigment and a covering layer that covers the core. The covering layer is formed of the absorbed resin. The pigment dispersion resin is hydrophilic, and hence the absorbed resin absorbed on surfaces of the quinacridone pigment allows the quinacridone pigment to be dispersed in the aqueous medium. On the other hand, the unabsorbed resin is not absorbed in the quinacridone pigment. The unabsorbed resin is free in the aqueous medium. The content percentage of the unabsorbed resin with respect to the pigment dispersion resin (hereinafter, may be referred to as an unabsorbed resin ratio) is preferably 20 weight percent or more and 50 weight percent or less.

As the pigment dispersion resin, there are, for example, acrylic resin, styrene acrylic resin, styrene maleic acid resin, and polyurethane resin. In view of allowing the quinacridone pigment to be stably dispersed, the pigment dispersion resin is preferably styrene acrylic resin.

The styrene acrylic resin contains at least, as repeating units, a repeating unit derived from at least one type of styrene or a derivative thereof, and a repeating unit derived from at least one type of (meth)acryl acid. The styrene acrylic resin preferably further contains, as repeating units, a repeating unit derived from at least one type of (meth)acryl acid ester.

As a first monomer that can form the repeating unit derived from styrene or its derivative, there are, for example, styrene, α-methyl styrene, and vinyl toluene. The first monomer is preferably styrene. The content percentage of the repeating unit derived from styrene or its derivative with respect to all repeating units of the pigment dispersion resin is preferably 25.0 weight percent or more and 60.0 weight percent or less.

As a second monomer that can form the repeating unit derived from (meth)acryl acid, there are, for example, acryl acid, and methacryl acid. The second monomer is preferably methacryl acid. The content percentage of the repeating unit derived from (meth)acryl acid with respect to all repeating units of the pigment dispersion resin is preferably 4.5 weight percent or more and 15.0 weight percent or less, and more preferably 8.0 weight percent or more and 11.0 weight percent or less. If the pigment dispersion resin has the repeating units derived from both acryl acid and methacryl acid, the content percentage of the repeating unit derived from (meth)acryl acid is the total content percentage of the repeating units derived from acryl acid and methacryl acid.

As a third monomer that can form the repeating unit derived from (meth)acryl acid ester, there is, for example, (meth)acryl acid alkyl ester. The (meth)acryl acid alkyl ester is preferably (meth)acryl acid alkyl ester having 1 or more and 8 or less carbon atoms in the alkyl group, and more preferably (meth)acryl acid alkyl ester having 1 or more and 4 or less carbon atoms in the alkyl group, and still more preferably (meth)acryl acid methyl and (meth)acryl acid butyl, and particularly preferably methacryl acid methyl and acryl acid butyl. The content percentage of the repeating unit derived from (meth)acryl acid ester with respect to all repeating units of the pigment dispersion resin is preferably 35.0 weight percent or more and 70.0 weight percent or less, and more preferably 50.0 weight percent or more and 70.0 weight percent or less. If the pigment dispersion resin has repeating units derived from two or more types of (meth)acryl acid ester, the content percentage of the repeating unit derived from (meth)acryl acid ester is the total content percentage of the repeating units derived from two or more types of (meth)acryl acid ester.

The pigment dispersion resin preferably has a repeating unit derived from at least one type of (meth)acryl acid, a repeating unit derived from at least one type of (meth)acryl acid alkyl, and a repeating unit derived from styrene. The pigment dispersion resin more preferably has a repeating unit derived from one type of (meth)acryl acid, a repeating unit derived from one or two types of (meth)acryl acid alkyl, and a repeating unit derived from styrene. It is particularly preferred that the pigment dispersion resin has a repeating unit derived from methacryl acid, a repeating unit derived from methacryl acid methyl, a repeating unit derived from acryl acid butyl, and a repeating unit derived from styrene. The content percentage of the repeating unit derived from at least one type of (meth)acryl acid (preferably, the content percentage of the repeating unit derived from one type of (meth)acryl acid, and more preferably, the content percentage of the repeating unit derived from methacryl acid) with respect to all repeating units of the pigment dispersion resin is preferably 8.0 weight percent or more and 11.0 weight percent or less.

The acid number of the pigment dispersion resin is preferably 60 mgKOH/g or more and 300 mgKOH/g or less, and more preferably 80 mgKOH/g or more and 150 mgKOH/g or less, and still more preferably 100 mgKOH/g or more and 130 mgKOH/g or less. If the acid number of the pigment dispersion resin is 60 mgKOH/g or more, the pigment particles are properly dispersed in the aqueous medium, and color development and tinting power of the ink are optimized. On the other hand, if the acid number of the pigment dispersion resin is 300 mgKOH/g or less, preservation stability of the ink is optimized.

The mass average molecular weight of the pigment dispersion resin is preferably 10,000 or more and 50,000 or less, and more preferably 15,000 or more and 30,000 or less. If the mass average molecular weight of the pigment dispersion resin is 10,000 or more and 50,000 or less, viscosity of the ink is optimized.

In order to suppress occurrence of the ejection displacement of ink from the recording head and to allow the pigment particles to be properly dispersed in the aqueous medium, a weight ratio of the pigment with respect to the pigment dispersion resin (hereinafter, may be referred to as a pigment/resin ratio) is preferably 5.0 or less, and more preferably 0.1 or more and 2.5 or less, and still more preferably 0.5 or more and 2.5 or less. The pigment/resin ratio can be calculated by the calculating formula "pigment/resin ratio=weight of pigment/weight of pigment dispersion resin". The weight of the pigment dispersion resin is the total weight of the absorbed resin and the unabsorbed resin.

The content percentage of the pigment dispersion resin in the ink is preferably 0.5 weight percent or more and 8.0 weight percent or less, and is more preferably 1.5 weight percent or more and 4.0 weight percent or less. If the content percentage of the pigment dispersion resin is 0.5 weight percent or more, aggregation of the quinacridone pigment can be appropriately suppressed. If the content percentage of the pigment dispersion resin is 8.0 weight percent or less, nozzle clogging of the recording head can be appropriately suppressed.

<Aqueous Medium>

The ink contains aqueous medium. The aqueous medium is a medium containing water. The aqueous medium may function as a solvent, and may be function as a dispersion medium. As an example of the aqueous medium, there is a medium containing water and organic solvent. In order to enhance compatibility with water, the organic solvent contained in the aqueous medium is preferably water-soluble organic solvent. The water-soluble organic solvent is an organic solvent that is uniformly miscible with water at any ratio.

As the water-soluble organic solvent, there are, for example, a glycol compound, a triol compound, a glycol ether compound, a lactam compound, a nitrogen-containing compound, an acetate compound, γ-butyrolactone, thiodiglycol, and dimethyl sulfoxide.

As the glycol compound, there are, for example, ethylene glycol, 1,3-propanediol, propylene glycol, 1,3-butanediol, 1,2-pentanediol, 1,5-pentanediol, 1,2-hexanediol, 1,2-octanediol, 1,8-octanediol, 3-methyl-1,3-butanediol, 3-methyl-1,2-pentanediol, 3-methyl-1,5-pentanediol, 2,4-diethyl-1,5-pentanediol, 2-butyl-2-ethyl-1,3-propanediol, diethylene glycol, dipropylene glycol, trimethylene glycol, triethylene glycol, tripropylene glycol, tetraethylene glycol, 2-ethyl-1,2-hexanediol, and thiodiglycol. The glycol compound is preferably 3-methyl-1,5-pentanediol.

As the triol compound, there are, for example, glycerin, 1,2,3-butanetriol, and 1,2,6-hexanetriol. The triol compound is preferably glycerin.

As the glycol ether compound, there are, for example, diethylene glycol diethylether, diethylene glycol monoethylether, diethylene glycol monobutyl ether, ethylene glycol monomethyl ether, ethylene glycol monobutyl ether, diethylene glycol monomethyl ether, diethylene glycol monoethylether, diethylene glycol diethylether, triethylene glycol monomethyl ether, triethylene glycol monoethylether, triethylene glycol monobutyl ether, and propylene glycol monomethyl ether. The glycol ether compound is preferably triethylene glycol monobutyl ether.

As the lactam compound, there are, for example, 2-pyrrolidone, and N-methyl-2-pyrrolidone.

As the nitrogen-containing compound, there are, for example, 1,3-dimethyl imidazolidinone, formamide, and dimethyl formamide.

As the acetate compound, there is diethylene glycol monoethylether acetate, for example.

The aqueous medium is preferably a mixed solvent of water, triethylene glycol monobutyl ether, 3-methyl-1,5-pentanediol, and glycerin.

The content percentage of the water-soluble organic solvent in the ink is preferably 10 weight percent or more and 40 weight percent or less, and more preferably 20 weight percent or more and 30 weight percent or less. The content percentage of the aqueous medium in the ink is preferably 30 weight percent or more and 95 weight percent or less, and more preferably 70 weight percent or more and 95 weight percent or less.

<Surface Acting Agent>

The ink preferably further contains a surface acting agent. The surface acting agent optimizes compatibility and dispersion stability of components of the ink. In addition, the surface acting agent optimizes permeability of the ink to a recording medium. The surface acting agent is preferably a non-ionic surface acting agent.

As the non-ionic surface acting agent, there are, for example, acetylene diol and an ethylene oxide adduct of acetylene diol. As the acetylene diol, there are, for example, 2,4,7,9-tetramethyl-5-decyn-4,7-diol, 3,6-dimethyl-4-octyne-3,6-diol, 3,5-dimethyl-1-hexyne-3-ol, and 2,4-dimethyl-5-hexyne-3-ol. The non-ionic surface acting agent is preferably an ethylene oxide adduct of acetylene diol, and an ethylene oxide adduct of acetylene glycol. An HLB value of the non-ionic surface acting agent is preferably 4 or more and 14 or less, and more preferably 4 or more and 8 or less, or 10 or more and 14 or less. If the ink contains the surface acting agent, the content percentage of the surface acting agent in the ink is preferably 0.01 weight percent or more and 1.00 weight percent or less.

<Other Components>

The ink may further contain, as necessary, a known additive (more specifically, a dissolve stabilizer, an anti-drying agent, an antioxidant, a viscosity modifier, a pH modifier, a neutralizer, an antifungal agent, or the like).

<Method for Synthesizing Quinacridone Pigment>

The general outline of the method for synthesizing the quinacridone pigment is already described above. Hereinafter, an example of the method for synthesizing the quinacridone pigment is further described in detail.

In the reaction (r-a), the compound (B) is obtained from the compound (A). Next, in the reaction (r-b), 1 molar equivalent of the compound (B) and 2 molar equivalent of aniline derivative are reacted, and hence 1 molar equivalent of compound (C) is obtained. Next, in the reaction (r-c), the compound (C) is oxidized, and an oxide of the compound (C) is obtained. Next, in the reaction (r-c), the oxide of the compound (C) is hydrolyzed, and a hydrolysate is obtained. Next, in the reaction (r-c), a dehydroring-closing reaction of the hydrolysate is carried out using a catalyst, and the compound (D) is obtained. The reaction temperature of the dehydroring-closing reaction is, for example, 90 degrees centigrade or more and 120 degrees centigrade or less. The reaction time of the dehydroring-closing reaction is, for example, 1 hour or more or 2 hour or less.

After the reaction (r-c) is carried out, the quinacridone pigment may undergo a solvent treatment process (hereinafter, may be referred to as the process A), and a post-processing process (hereinafter, may be referred to as the process B), for example.

(Process A)

In the process A, the quinacridone pigment is processed using a solvent. The quinacridone pigment before carrying out the process A is also referred to as crude and contains agglomerated particles having a low degree of crystallization. The quinacridone pigment before carrying out the process A has insufficient tinting strength. Therefore, by carrying out the process A, crystal growth of the quinacridone pigment and microparticulation of the quinacridone pigment are promoted. When crystal growth and microparticulation of the quinacridone pigment are promoted, tinting strength and color saturation of the quinacridone pigment are optimized. More specifically, by carrying out the process A, the crude of the quinacridone pigment becomes β-type or γ-type crystal of the quinacridone pigment, so that tinting strength and color saturation of the quinacridone pigment are improved. As the method for processing the quinacridone pigment, there is a method of kneading the quinacridone pigment and the solvent using a kneader (such as a salt milling kneader), for example. The temperature and the time of processing the quinacridone pigment are not particularly limited, and should be appropriately set so that desired particle size and particle size distribution of the quinacridone pigment will be obtained. The process A may be carried out while heating the quinacridone pigment. In addition, in the process A, an inorganic base (more specifically, sodium hydroxide, potassium hydroxide, or the like) as grinding aid may be added as necessary. The kneaded material of the quinacridone pigment obtained in the process A is washed with water or a solvent as necessary, to be a wet cake state, for example.

(Process B)

In the process B, the kneaded material of the quinacridone pigment obtained in the process A is post-processed. By carrying out the process B, the aggregation of the microparticulated quinacridone pigment is suppressed. By carrying out the process B, in addition to the tinting strength and color saturation of the quinacridone pigment given in the process A, good dispersibility and conservation stability can be given to the quinacridone pigment. As the post-process method, there is a method of removing the solvent from the kneaded material of the quinacridone pigment so as to separate the quinacridone pigment, for example. As the method for separating the quinacridone pigment, there are a filtering method, a drying method, and a method of distilling away the solvent by using a rotatory evaporator, for example. When distilling away the solvent, the temperature for distilling away the solvent is the boiling temperature of the solvent or higher, for example.

In at least one of the process A and the process B, the sulfur containing pigment derivative is preferably added. By adding the sulfur containing pigment derivative, aggregation of the quinacridone pigment is suppressed, and both dispersibility and conservation stability of the quinacridone pigment can be achieved. When adding the sulfur containing pigment derivative in the process B, the sulfur containing pigment derivative may be added when the process of separating the pigment composition from the kneaded material is started, or may be added during the separating process. The weight of the sulfur containing pigment derivative (the total weight of the sulfur containing pigment derivative added in the process A and the process B if the sulfur containing pigment derivative is added in both the process A and the process B), with respect to 100 mass parts of the quinacridone pigment, is preferably 0.5 mass parts or more and 15 mass parts or less, and more preferably 1 mass parts or more and 15 mass parts or less, and still more preferably 4 mass parts or more and 14 mass parts or less. If the weight of the sulfur containing pigment derivative with respect to 100 mass parts of the quinacridone pigment is 0.5 mass parts or more and 15 mass parts or less, hue of the quinacridone pigment is optimized. If the weight of the sulfur containing pigment derivative with respect to 100 mass parts of the quinacridone pigment is 4 mass parts or more and 14 mass parts or less, the predetermined sulfur concentration can be easily adjusted to a value within a desired range.

If the sulfur containing pigment derivative is added in both the process A and the process B, the type (such as chemical constitution) of the sulfur containing pigment derivative added in the process B may be the same as or different from the type of the sulfur containing pigment derivative added in the process A. In addition, if the sulfur containing pigment derivative is added in both the process A and the process B, in order to optimize the tinting strength of the quinacridone pigment, the weight of the sulfur containing pigment derivative added in the process B is preferably the same as or more than the weight of the sulfur containing pigment derivative added in the process A.

After the process B is carried out, the separated quinacridone pigment undergoes washing (e.g., washing with a filter press), drying, and grinding, as necessary. However, also after washing, the synthetic intermediates may remain in the quinacridone pigment. Therefore, when producing the ink, it is preferred to remove at least a part of the synthetic intermediates by carrying out the activated carbon treatment or the like on the pigment dispersion liquid. In this way, occurrence of the ejection displacement of ink from the recording head can be suppressed.

<Method for Producing Ink>

An example of the method for producing the ink of the first embodiment is described. The produced ink is the ink of the first embodiment. The aqueous medium contained in the ink contains a first aqueous medium and a second aqueous medium. The method for producing the ink of the first embodiment includes a pigment composition preparation process, a pigment dispersion liquid preparation process, the removal process, and an ink preparation process. Next, details of a method for producing the ink of the first embodiment are described.

(Pigment Composition Preparation Process)

In the pigment composition preparation process, the quinacridone pigment composition is prepared. The quinacridone pigment composition contains the quinacridone pigment and the sulfur containing pigment derivative (i.e., a quinacridone pigment derivative having a sulfur atom). In the quinacridone composition prepared in the pigment composition preparation process, the content percentage of the sulfur containing pigment derivative with respect to the total weight of the quinacridone pigment and the sulfur containing pigment derivative is preferably 4 weight percent or more and 12 weight percent or less. If a commercially available quinacridone pigment composition is used, it is preferred to select a production lot having a desired content percentage (for example, a content percentage of 4 weight percent or more and 12 weight percent or less) of the sulfur containing pigment derivative. If the content percentage of the sulfur containing pigment derivative is 4 weight percent or more and 12 weight percent or less, the predetermined sulfur concentration can be appropriately adjusted within a predetermined range.

(Pigment Dispersion Liquid Preparation Process)

In the pigment dispersion liquid preparation process, the quinacridone pigment composition, the pigment dispersion resin, and the first aqueous medium are mixed, and the pigment dispersion liquid is obtained.

By mixing the components contained in the pigment dispersion liquid by wet dispersion using a media type wet disperser, the pigment dispersion liquid is prepared. As the media type wet disperser, there are, for example, bead mills (more specifically, "NanoGrain Mill" manufactured by Asada Ironworks co., Ltd., "MSC Mill" manufactured by Nippon Coke & Engineering Co., Ltd., and "DYNO®—MILL" manufactured by Willy A. Bachofen AG, and the like).

The discharge rate of the media type wet disperser is 200 g/min or more and 600 g/min or less, for example. There is a tendency that the unabsorbed resin ratio becomes lower as the discharge rate of the media type wet disperser becomes smaller.

In the wet dispersion using the media type wet disperser, beads having a small particle size (e.g., beads having a diameter of 0.5 mm or more and 1.0 mm or less) are used as the media, for example. By changing the diameter of the beads, the dispersion degree of the pigment particles and the unabsorbed resin ratio can be changed, for example. There is a tendency that $D_{50}$ of the pigment particles is smaller as the diameter of the beads is smaller. There is a tendency that as the diameter of the beads is smaller, the core containing the quinacridone pigment can be covered with the pigment dispersion resin more easily, and the unabsorbed resin ratio becomes lower. Though the material of the beads is not particularly limited, but is preferably a hard material (such as glass or zirconia).

The content percentage of the quinacridone pigment in the pigment dispersion liquid is preferably 5 weight percent or more and 25 weight percent or less, and more preferably 10 weight percent or more and 20 weight percent or less. The content percentage of the pigment dispersion resin in the pigment dispersion liquid is preferably 2 weight percent or more and 10 weight percent or less, and more preferably 4 weight percent or more and 8 weight percent or less. If the pigment dispersion liquid contains the surface acting agent, the content percentage of the surface acting agent in the pigment dispersion liquid is preferably 0.1 weight percent or more and 2 weight percent or less, and more preferably 0.3 weight percent or more and 1 weight percent or less.

The first aqueous medium is preferably water. In the pigment dispersion liquid preparation process, any added component (such as the surface acting agent) may be further mixed. The volume median diameter ($D_{50}$) of the pigment particles dispersed in the pigment dispersion liquid is preferably 70 nm or more and 130 nm or less.

(Removal Process)

In the removal process, at least a part of the synthetic intermediates of the quinacridone pigment remaining in the quinacridone pigment is removed from the pigment dispersion liquid. In the removal process, at least a part of the synthetic intermediates of the quinacridone pigment remaining in the quinacridone pigment is removed so that the predetermined light absorbance becomes 0.17 or less.

When using a commercially available quinacridone pigment composition, the remaining amount of the synthetic intermediate in the quinacridone pigment composition may vary depending on production lots. When the removal process is carried out, a variation of the remaining amount of the synthetic intermediates depending on production lots can be uniformed, and it is possible to obtain the ink having a value of the predetermined light absorbance within a desired range.

As the method of removing at least a part of the synthetic intermediates from the pigment dispersion liquid, there is the activated carbon treatment. The activated carbon treatment is carried out by, for example, allowing the pigment dispersion liquid to flow through an activated carbon filter, and circulating the pigment dispersion liquid. When the ink contains the pigment dispersion liquid from which at least a part of the synthetic intermediates is removed, the predetermined light absorbance is easily adjusted to a value within a desired range.

In the activated carbon treatment, the flow rate of the circulated pigment dispersion liquid is 100 g/min or more and 300 g/min or less, for example. The time for circulating the pigment dispersion liquid is 5 minutes or more and 30 minutes or less, for example. When one pass means that the pigment dispersion liquid of 1,000 g passes through the activated carbon filter, the number of performing one pass (the number of pass times) in the activated carbon treatment is 5 or less, for example, and is preferably 2 or more and 5 or less.

(Ink Preparation Process)

In the ink preparation process, the pigment dispersion liquid after the removal process and the second aqueous medium are mixed so as to obtain the ink. The mixing is carried out using a stirrer, for example. The second aqueous medium is preferably a mixed solvent of water and water-soluble organic solvent, and more preferably a mixed solvent of water, triethylene glycol monobutyl ether, 3-methyl-1,5-pentanediol, and glycerin. The ratio of the pigment dispersion liquid in all the materials of the ink is, for example, 25 weight percent or more and 60 weight percent or less. In the ink preparation process, a component that is added as necessary (such as the surface acting agent) may be further mixed. After mixing components of the ink, it may be possible to remove foreign objects and coarse particles using a filter (a filter having an aperture of 5 μm or less). Note that the ink of the first embodiment can be appropriately used in an ink jet recording apparatus described later, for example.

Second Embodiment

InkJet Recording Apparatus

Next, an inkjet recording apparatus of a second embodiment of the present disclosure is described. The inkjet recording apparatus of the second embodiment is equipped with a conveying unit that conveys a recording medium, and a recording head. The recording head ejects the ink of the first embodiment to the recording medium. Hereinafter, with reference to the drawings, details of the inkjet recording apparatus of the second embodiment are described. Note that in the drawings to be referred to, for easy understanding, components are schematically illustrated as subjects, and sizes and the number of the illustrated components may be different from reality.

Figure 2:
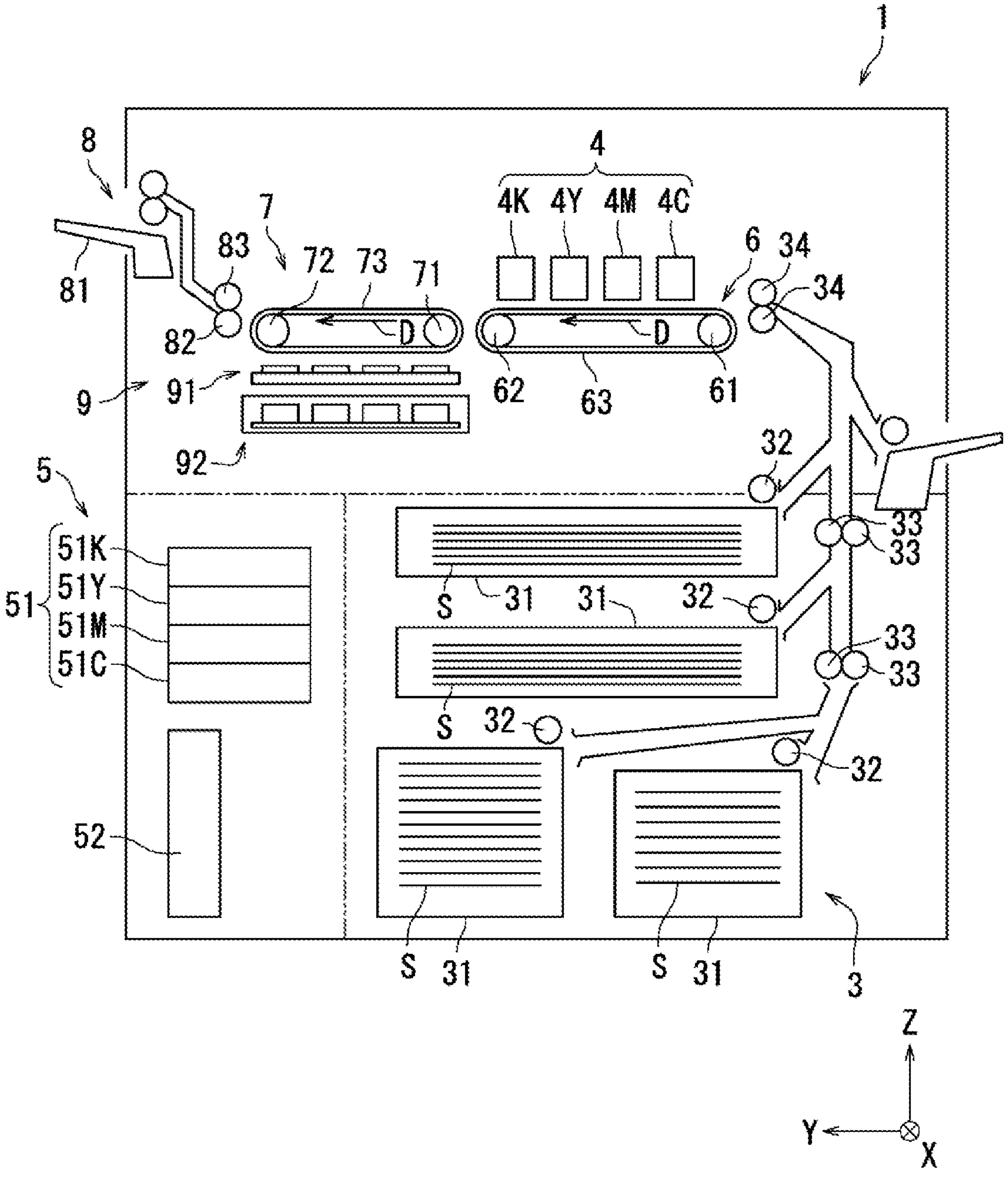
FIG. 2 is a diagram illustrating an example of an inkjet recording apparatus of a second embodiment of the present disclosure.
Figure 3:
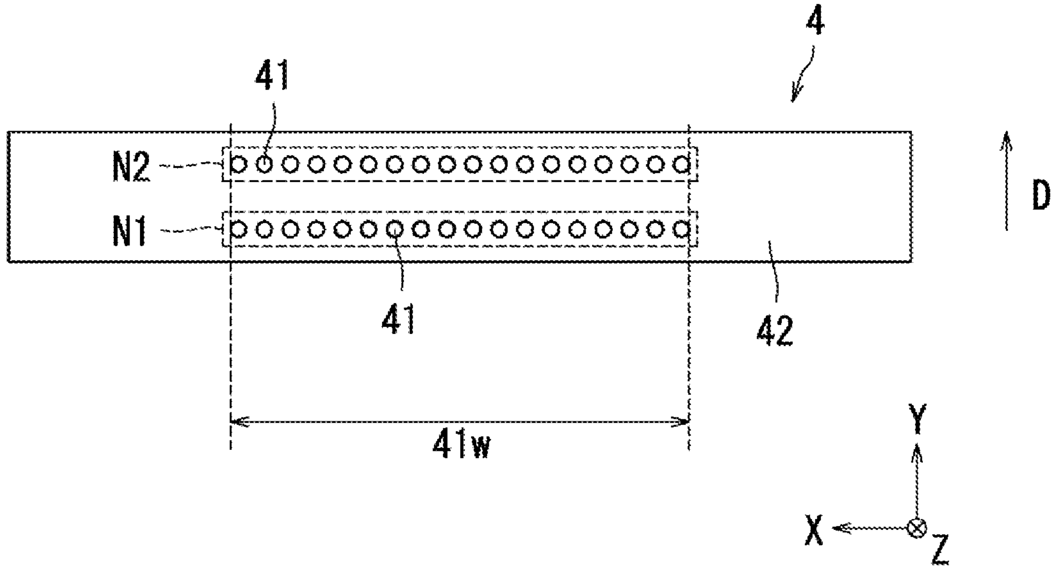
FIG. 3 is a diagram illustrating an underside of a recording head illustrated in FIG. 2.

FIG. 2 is a diagram illustrating an ink jet recording apparatus 1 is an example of the ink jet recording apparatus according to the second embodiment. In FIG. 2 and FIG. 3 described later, X-axis, Y-axis, and Z-axis are perpendicular to each other.

The ink jet recording apparatus 1 illustrated in FIG. 2 includes a paper feed unit 3, a first recording head 4C, a second recording head 4M, a third recording head 4Y, a fourth recording head 4K, a liquid container 5, a first conveying unit 6, a second conveying unit 7, a discharge unit 8, and a maintenance unit 9. Hereinafter, if it is not necessary to distinguish among the first to fourth recording heads 4C to 4K, they may be each referred to simply as a "recording head 4".

The paper feed unit 3 includes a plurality of sheet feed cassettes 31, a plurality of pickup rollers 32, a plurality of conveying rollers 33, and a registration roller pair 34. The sheet feed cassette 31 stores stacked recording media S. The pickup roller 32 takes out the recording media S stored in the sheet feed cassette 31, one by one. The conveying roller 33 conveys the recording medium S taken out by the pickup roller 32. The registration roller pair 34 allows the recording medium S conveyed by the conveying roller 33 to temporarily wait and then be supplied to the first conveying unit 6 at a predetermined timing.

The recording heads 4 are arranged above a first conveyor belt 63. The first to fourth recording heads 4C to 4K are aligned in this order in a conveying direction D of the recording medium S. The first to fourth recording heads 4C to 4K are arranged at the same height. The first to fourth recording heads 4C to 4K are respectively filled with four different color inks (e.g., cyan, magenta, yellow, and black inks). The ink filled in the second recording head 4M is the magenta ink, which is the ink of the first embodiment. The recording heads 4 each eject the ink to the recording medium S. Among the recording heads 4, the second recording head 4M ejects the ink of the first embodiment as the magenta color to the recording medium S. As a result, an image (e.g., a color image) is formed on the recording medium S conveyed by the first conveyor belt 63.

As the ink of the first embodiment is used, the ink jet recording apparatus 1 of the second embodiment can suppress occurrence of ejection displacement of the ink from the second recording head 4M, and has good dispersion stability of the ink, for the same reason as that described above in the first embodiment.

The liquid container 5 includes a first ink tank 51C, a second ink tank 51M, a third ink tank 51Y, a fourth ink tank 51K, and a cleaning liquid tank 52. Hereinafter, if it is not necessary to distinguish among the first to fourth ink tanks 51C to 51K, they may be each referred to simply as an "ink tank 51". The first to fourth ink tanks 51C to 51K respectively store four different color inks (e.g., cyan, magenta, yellow, and black inks). The ink stored in the second ink tank 51M is the magenta ink, which is the ink of the first embodiment. The first to fourth ink tanks 51C to 51K respectively supply the inks to the first to fourth recording heads 4C to 4K. The cleaning liquid tank 52 supplies the cleaning liquid to a liquid impregnation body 91.

The first conveying unit 6 is disposed on a downstream side of the paper feed unit 3 in the conveying direction D of the recording medium S. The first conveying unit 6 includes a first driven roller 61, a first driving roller 62, and the first conveyor belt 63. The first driving roller 62 is disposed on the downstream side of the first driven roller 61 in the conveying direction D of the recording medium S. The first conveyor belt 63 is an endless belt stretched around the first driven roller 61 and the first driving roller 62. The first driving roller 62 is driven to rotate in a counterclockwise direction in FIG. 2. In this way, the first driving roller 62 drives the first conveyor belt 63 to rotate. In this way, the first conveyor belt 63 conveys the recording medium S fed from the paper feed unit 3 to the second conveying unit 7 in the conveying direction D. The first driven roller 61 is driven to rotate by the first driving roller 62 via the first conveyor belt 63.

The second conveying unit 7 is disposed on the downstream side of the first conveying unit 6 in the conveying direction D of the recording medium S. The second conveying unit 7 includes a second driven roller 71, a second driving roller 72, and a second conveyor belt 73. The second driving roller 72 is disposed on the downstream side of the second driven roller 71 in the conveying direction D of the recording medium S. The second conveyor belt 73 is an endless belt stretched around the second driven roller 71 and the second driving roller 72. The second driving roller 72 is driven to rotate in the counterclockwise direction in FIG. 2. In this way, the second driving roller 72 drives the second conveyor belt 73 to rotate. In this way, second conveyor belt 73 conveys the recording medium S conveyed from the first conveying unit 6 to the discharge unit 8, in the conveying direction D. The second driven roller 71 is driven to rotate by the second driving roller 72 via the second conveyor belt 73.

The discharge unit 8 is disposed on the downstream side of the second conveying unit 7 in the conveying direction D of the recording medium S. The discharge unit 8 includes a discharge tray 81, a discharge driving roller 82, and a discharge driven roller 83. The discharge driving roller 82 and the discharge driven roller 83 are pressed to contact each other at facing positions. The discharge driving roller 82 is driven to rotate in the counterclockwise direction in FIG. 2. The discharge driven roller 83 rotates following the rotation of the discharge driving roller 82. In this way, the discharge driving roller 82 and the discharge driven roller 83 discharges the recording medium S conveyed from the second conveying unit 7 onto the discharge tray 81. The discharged recording medium S is placed on the discharge tray 81.

The maintenance unit 9 includes the liquid impregnation body 91, and a cleaning member 92. The liquid impregnation body 91 and the cleaning member 92 each can move between a position below the second conveying unit 7 and a position facing an ejection face 42 of the recording head 4 (see FIG. 3). The liquid impregnation body 91 impregnates the cleaning liquid. The liquid impregnation body 91 contacts with the ejection face 42 of the recording head 4 (see FIG. 3) so as to supply the cleaning liquid to the ejection face 42. The liquid impregnation body 91 is sponge, non-woven fabric, or water absorbing sheet, for example. The cleaning member 92 wipes the ejection face 42 of the recording head 4. In this way, ink adhered to the ejection face 42 is cleaned. The cleaning member 92 is a rubber wiper, for example.

Next, with reference to FIG. 3, the recording head 4 is further described. FIG. 3 is a diagram illustrating an underside of the recording head 4 illustrated in FIG. 2.

As illustrated in FIG. 3, the recording head 4 includes a first nozzle row N1, a second nozzle row N2, and the ejection face 42. For easy understanding, in FIG. 3, each of the first nozzle row N1 and the second nozzle row N2 is enclosed by a broken line. Each of the first nozzle row N1 and the second nozzle row N2 includes a plurality of nozzles 41. The nozzle 41 ejects the ink to the recording medium S. The nozzle 41 has an opening in the ejection face 42. The first nozzle row N1 and the second nozzle row N2 are disposed side by side in the conveying direction D of the recording medium S. In each of the first nozzle row N1 and the second nozzle row N2, the plurality of nozzles 41 are arranged with spaces in a direction perpendicular to the conveying direction D of the recording medium S. The recording head 4 is a line head, for example.

A width 41*w* of each of the first nozzle row N1 and the second nozzle row N2 (i.e., a width of an area that can be recorded by the recording head 4) is the same as or more than the width of the recording medium S. Therefore, the recording head 4 in the fixed state can record an image on the recording medium S conveyed on the first conveyor belt 63. In other words, the inkjet recording apparatus 1 adopts a single pass method, which is a method without a shuttle movement. The inkjet recording apparatus 1 of the second embodiment, which is equipped with such the recording head 4, can print at a higher speed than an ink jet recording apparatus equipped with a serial head.

Thus, the inkjet recording apparatus 1 as an example of the inkjet recording apparatus of the second embodiment is described above. However, the inkjet recording apparatus of the second embodiment is not limited to the inkjet recording apparatus 1. The inkjet recording apparatus of the second embodiment may adopt a multipass method. In addition, in the first to fourth recording heads 4C to 4K, the number of the nozzles 41, the interval of the nozzles 41, and the positional relationship of the nozzles 41 can be appropriately set in accordance with a specification of the apparatus. In addition, the arrangement order of the first to fourth recording heads 4C to 4K is not limited to that illustrated in the diagram, but may be other arrangement order. In addition, the number of the recording heads 4 is not limited to four, but may be three, or five or more.

Example

Hereinafter, Example of the present disclosure is described. However, the present disclosure is not limited to the following Example. Note that in the following Example, ion-exchanged water may be referred to simply as water.

[Preparation of Pigment Dispersion Resin]

As the pigment dispersion resin used for preparation of the ink, resin (R-A) was prepared. The resin (R-A) had repeating units, which included a repeating unit derived from methacryl acid (MAA unit), a repeating unit derived from methacryl acid methyl (MMA unit), a repeating unit derived from acryl acid butyl (BA unit), and a repeating unit derived from styrene (ST unit). The resin (R-A) had a mass average molecular weight (Mw) of 20,000 and an acid number of 100 mgKOH/g. With respect to the weight of all repeating units of the resin (R-A), the content percentages of the MAA unit, the MMA unit, the BA unit, and the ST unit were 8.1 weight percent, 36.9 weight percent, 30.0 weight percent, and 25.0 weight percent, respectively.

<Measurement of Acid Number of Resin>

The acid number of the resin (R-A) was measured according to "JIS (Japanese Industrial Standard) K0070:1992".

<Measurement of Mass Average Molecular Weight of Resin>

The mass average molecular weight of the resin (R-A) was measured using a gel permeation chromatography ("HLC-8020GPC" manufactured by Tosoh Corporation) according to the following conditions. Calibration curves were made using TSKgel Standard polystyrene produced by Tosoh Corporation, i.e., F-40, F-20, F-4, F-1, A-5000, A-2500, and A-1000, and n-propyl benzene.

(Measurement Condition of Mass Average Molecular Weight)

column: "TSKgel SuperMultiporeHZ-H" produced by Tosoh Corporation (semi-micro column of 4.6 mm I.D.×15 cm)
the number of columns: 3
eluant: tetrahydrofuran
flow rate: 0.35 mL/min
sample injection volume: 10 μL
measurement temperature: 40 degrees centigrade
detector: RI (refraction index) detector

[Preparation of Quinacridone Pigment Composition]

<Preparation of Pigment Composition (PR122-A)>

A wet cake of the quinacridone pigment (C.I. Pigment Red 122) having a solid content of 96 mass parts and 5 mass parts of methanol were mixed so as to obtain liquid mixture A. The whole liquid mixture A and 4 mass parts of the sulfur containing pigment derivative (1-1) were mixed so as to obtain a liquid mixture B. Methanol was distilled under reduced pressure from the liquid mixture B at 80 degrees centigrade so as to obtain a residue. The residue was filtered using water and dried at 80 degrees centigrade so as to obtain a dry matter. The dry matter was ground using Counterjet Mill® (manufactured by Hosokawa Micron Corporation) so as to obtain the pigment composition (PR122-A). In the pigment composition (PR122-A), the content percentage of the sulfur containing pigment derivative with respect to the total weight of the quinacridone pigment and the sulfur containing pigment derivative was 4 weight percent.

<Preparation of Pigment Compositions (PR122-B) to (PR122-E)>

The pigment compositions (PR122-B) to (PR122-E) were prepared in the same method as the preparation of the pigment composition (PR122-A), except for changing the solid content amount of the wet cake of the quinacridone pigment and the additive amount of the sulfur containing pigment derivative, so that the content percentages of the sulfur containing pigment derivative with respect to the total weight of the quinacridone pigment and the sulfur containing pigment derivative become the values shown in Table 3. In each preparation of the pigment compositions (PR122-B) to (PR122-E), the total of the solid content amount of the quinacridone pigment and the additive amount of the sulfur containing pigment derivative was set to 100 mass parts.

<Preparation of Pigment Composition (PR122-F)>

The pigment composition (PR122-F) was prepared in the same method as the preparation of the pigment composition (PR122-A), except for changing the sulfur containing pigment derivative (1-1) to the sulfur containing pigment derivative (1-2), and changing the solid content of the wet cake of the quinacridone pigment and the additive amount of the sulfur containing pigment derivative, so that the content percentage of the sulfur containing pigment derivative with respect to the total weight of the quinacridone pigment and the sulfur containing pigment derivative becomes the value shown in Table 5. In the preparation of the pigment composition (PR122-F), the total of the solid content of the quinacridone pigment and the additive amount of the sulfur containing pigment derivative was set to 100 mass parts.

<Preparation of Pigment Composition (PV19)>

The pigment composition (PV19) was prepared in the same method as the preparation of the pigment composition (PR122-A), except for changing the wet cake of the quinacridone pigment (C.I. Pigment Red 122) to the wet cake of the quinacridone pigment (C.I. Pigment Violet 19), and changing the solid content of the wet cake of the quinacridone pigment and the additive amount of the sulfur containing pigment derivative, so that the content percentage of the sulfur containing pigment derivative with respect to the total weight of the quinacridone pigment and the sulfur containing pigment derivative becomes the vale shown in Table 5. In the preparation of the pigment composition (PV19), the total of the solid content of the quinacridone pigment and the additive amount of the sulfur containing pigment derivative was set to 100 mass parts.

[Discussion 1: Predetermined Sulfur Concentration]

The predetermined sulfur concentration was discussed. The inks (A-1) to (A-3) and (B-1) to (B-2) to be used for the discussion were prepared by the following method.

<Preparation of Ink (A-1)>

(Preparation of Pigment Dispersion Liquid)

The pigment dispersion liquid was prepared so as to obtain composition d-a shown in Table 1.

TABLE 1

| pigment dispersion liquid | composition d-a (mass parts) |
|---|---|
| water | remaining amount |
| resin (R-A) | 6.0 |
| sodium hydroxide | predetermined amount |
| quinacridone pigment composition | 15.0 |
| Olfine E1010 | 0.5 |
| total | 100 |

Terms in Table 1 are defined as follows. “Olfine E1010” represents a non-ionic surface acting agent (“Olfine® E1010” produced by Nissin Chemical Industry Co., Ltd., having content of ethylene oxide adduct of acetylene diol, active ingredient concentration of 100 weight percent, and HLB value of 13.5±0.5).

First, 6.0 mass parts of the resin (R-A) and sodium hydroxide aqueous solution were mixed. The sodium hydroxide aqueous solution contained a predetermined amount of sodium hydroxide. The “predetermined amount” as the additive amount of sodium hydroxide shown in Table 1 is 1.05 times the amount necessary for equal neutralization of the resin (R-A). In this way, the resin (R-A) was neutralized by the equal amount (strictly, 105% equivalence) of sodium hydroxide, so as to obtain aqueous solution I containing the resin (R-A).

The whole amount of the obtained aqueous solution I, 15.0 mass parts of the quinacridone pigment composition (PR122-A), 0.5 mass parts of the non-ionic surface acting agent (“Olfine® E1010” produced by Nissin Chemical Industry Co., Ltd.), and remaining amount of water were put into a vessel. Using a media type wet disperser (“DYNO®-MILL” manufactured by Willy A. Bachofen AG (WAB)), the content of the vessel was mixed so as to obtain liquid mixture II.

Note that the “remaining amount” as additive amount of water shown in Table 1 means an amount that makes 100.0 mass parts of the liquid mixture II. The remaining amount of water shown in Table 1 is total amount of the water put into the vessel and water contained in the aqueous solution I (specifically, water contained in the sodium hydroxide aqueous solution used to neutralize the resin, and water generated in the neutralization reaction of the resin and the sodium hydroxide).

Next, using zirconia beads (particle size 0.5 mm) as media and a bead mill (“NanoGrain Mill” manufactured by Asada Ironworks co., Ltd.), dispersing process of the content of the vessel was carried out. Conditions of dispersing by the bead mill were a temperature of 10 degrees centigrade, a peripheral speed of 8 m/sec, and a discharge rate of 300 g/min. In this way, the pigment dispersion liquid III before the activated carbon treatment was obtained.

It was confirmed that pigment particles having a volume median diameter in a range of 70 nm or more and 130 nm or less were dispersed in the pigment dispersion liquid III. The volume median diameter of the pigment particles was measured using a measurement sample that was a diluent of the pigment dispersion liquid III diluted with water by 300 times, and the dynamic light scattering type particle size distribution analyzer (“Zetasizer Nano ZS” manufactured by Spectris Co., Ltd.).

(Activated Carbon Treatment)

The activated carbon treatment of the obtained pigment dispersion liquid III was carried out. Specifically, 1,800 g of the pigment dispersion liquid III was allowed to pass through the activated carbon filter (“YCC-1L” produced by Nihon Filter Co., Ltd., in which the activated carbon type is granular coconut shell activated carbon), and the pigment dispersion liquid III is circulated at a flow rate of 190 g/min. Hereinafter, one pass means that 1,000 g of the pigment dispersion liquid III passes through the activated carbon filter. As the flow rate was 190 g/min, time necessary for one pass was 5 minutes 15 seconds (=(1,000 g)/(190 g/min)). When 2 passes were completed, circulation of the pigment dispersion liquid III was stopped so as to obtain the pigment dispersion liquid IV after the activated carbon treatment. Therefore, in the activated carbon treatment, the number of performing one pass (the number of pass times) was 2.

(Preparation of Ink)

The ink (A-1) was prepared so as to obtain composition i-a shown in Table 2.

TABLE 2

| ink | composition i-a (mass parts) |
|---|---|
| pigment dispersion liquid | 40.0 |
| Surfynol 420 | 0.3 |
| triethylene glycol monobutyl ether | 4.0 |
| 3-methyl-1,5-pentanediol | 20.0 |
| glycerin | 5.0 |
| water | remaining amount |
| total | 100.0 |

Terms in Table 2 are defined as follows. “Surfynol 420” represents a non-ionic surface acting agent (“Surfynol® 420” produced by Nissin Chemical Industry Co., Ltd., having content of ethylene oxide adduct of acetylene glycol, active ingredient concentration of 100 weight percent, and HLB value of 4).

First, water was put into a flask equipped with a stirrer (“Three-one motor (registered trademark) BL-600” manufacture by Shinto Scientific Co., Ltd.). While stirring the content of the flask using the stirrer at a stirring speed of 400 rpm, the pigment dispersion liquid IV obtained in the above activated carbon treatment, non-ionic surface acting agent (“Surfynol® 420” produced by Nissin Chemical Industry Co., Ltd.), triethylene glycol monobutyl ether, 3-methyl-1, 5-pentanediol, and glycerin were put in, so as to obtain liquid mixture V. The input amount of each raw material was as shown in Table 2. The “remaining amount” as additive amount of water shown in Table 2 means an amount that makes 100.0 mass parts of the liquid mixture V. The liquid mixture V was filtered using a filter having an aperture of 5 μm, and hence foreign objects and coarse particles were removed from the liquid mixture V. In this way, the ink (A-1) was obtained.

<Preparation of Inks (A-2) to (A-3) and (B-1) to (B-2)>

The ink (A-2) to (A-3) and (B-1) to (B-2) were prepared in the same method as the preparation of the ink (A-1), except for changing the type of the quinacridone pigment composition and the discharge rate of the bead mill in the dispersing process as shown in Table 3 described later.

[Measurement]

The measuring object (each of the inks (A-1) to (A-3) and (B-1) to (B-2) was centrifugalized by the following method. Further, for each obtained supernatant liquid, predetermined sulfur concentration, the wavelength at the predetermined peak, and the predetermined light absorbance were measured.

<Centrifuging Process>

The centrifuging process of the measuring object of 2 g sealed in a container was carried out at a rotational frequency of 140,000 rpm (corresponding to a centrifugal force of 1,050,000 G) for three hours under environment of temperature of 23 degrees centigrade, using an ultracentrifuge ("Himac® CS150FNX" manufactured by Eppendorf Himac Technologies Co., Ltd., having a rotor of S140AT). In this way, the pigment particles contained in the ink as the measuring object were precipitated. Note that approximately 0.4 g of the supernatant liquid was obtained from 1 g of the ink.

<Predetermined Sulfur Concentration>

The supernatant liquid contained in the ink after the centrifuging process was collected with a syringe of 1 mL. The collected supernatant liquid is diluted with water by ten times to be a measurement sample. The measurement sample was measured using an inductively coupled plasma (ICP) weight analyzing device ("iCAP PRO ICP-OES Duo" manufactured by Thermo Fisher Scientific Inc.). The measured value of the measurement sample (i.e., the sulfur concentration in 10-fold diluent of the supernatant liquid) was regarded as the predetermined sulfur concentration (ppm). The predetermined sulfur concentration is shown in Table 3. Note that the sulfur concentration was determined using a calibration curve generated using a sample having a known sulfur concentration.

<Wavelength at Predetermined Peak and Predetermined Light Absorbance>

The supernatant liquid contained in the ink after the centrifuging process was collected with a syringe of 1 mL. The collected supernatant liquid was diluted with water by 25 times to be a measurement sample. The measurement sample in a cell was measured using a spectral photometer ("U-3000" manufactured by Hitachi High-Tech Science Corporation) under the following conditions, so as to obtain the ultraviolet and visible ray absorption spectrum of the measurement sample. From the ultraviolet and visible ray absorption spectrum of the measurement sample, a wavelength (nm) was read, at which a predetermined peak appears in the measurement sample (i.e., the 25-fold diluent of the supernatant liquid). In addition, from the ultraviolet and visible ray absorption spectrum of the measurement sample, light absorbance at the predetermined peak in the measurement sample (i.e., the 25-fold diluent of the supernatant liquid) was read, and the read light absorbance was regarded as the predetermined light absorbance. The wavelength at the predetermined peak and the predetermined light absorbance are shown in Table 3. Note that as shown in Table 3, the wavelength at the predetermined peak varies depending on the ink, and the reason is considered that the predetermined peak was a little shifted due to an influence of sulfur atoms of the sulfur containing pigment derivative contained in the ink.

(Measurement Condition of Light Absorbance)

measurement wavelength range: 200 nm or more and 800 nm or less
scan speed: 300 nm/min
sampling interval: 1.00 nm
slit width: 1 nm
cell: quartz glass cell
optical path length: 10 mm
beam method: double beam
base line measurement: done
reference: ion-exchanged water

[Evaluation]

For the evaluation target (each of the inks (A-1) to (A-3) and (B-1) to (B-2)), ejection displacement and dispersion stability were evaluated by the following method. The evaluation result is shown in Table 3.

<Ejection Displacement>

As an evaluation machine that is used for evaluation, an ink jet recording apparatus (a prototype manufactured by Kyocera Document Solutions Japan Inc.) was used. This evaluation machine was equipped with a conveying unit and a piezo method line head having nozzles (having a radius of aperture of 10 μm) as the recording head. The ink as the evaluation target was set to the magenta ink recording head of the evaluation machine. As paper sheets, plain paper sheets ("C2" produced by Fuji Xerox Co., Ltd., A4 size PPC sheets) were used.

The temperature of the recording head was set to 40 degrees centigrade. The ink discharge rate per one pixel was set to 3.5 pL. Using the evaluation machine, an image (20.5 mm×29.0 mm) of image processing setting for discharging ink from all nozzles of the recording head was printed on paper sheets continuously for an hour. The first printed image of the continuous printing (initial image) and the last printed image of the continuous printing (printing durability image) were observed with the naked eye. Further, it was checked whether or not there was a white streak in each of the initial image and the printing durability image. The white streak is an image defect caused by the ejection displacement of ink from the recording head. The ejection displacement of ink from the recording head was determined according to the following criterion.

(Criterion of Ejection Displacement)

Good (A): The printing durability image does not have more white streaks than the initial image.

Bad (B): The printing durability image has more white streaks than the initial image.

<Dispersion Stability>

The ink of 30 g was put in a container having a volume of 50 mL, and the container was sealed. The container was put in an incubator whose internal temperature was set to 40 degrees centigrade, and was stored for two weeks. After two weeks of storage, the ink in the container was diluted with water by 100 times to be a measurement sample. Using a dynamic light scattering type particle size distribution analyzer ("Zetasizer Nano ZS" manufactured by Malvern Instruments Ltd.), a volume median diameter of the pigment particles contained in the measurement sample (post-storage $D_{50}$) was measured. The dispersion stability was determined according to the following criterion. Note that there is a tendency that if the post-storage $D_{50}$ is 140 nm or more, the pigment particles in the ink have low dispersion stability, and precipitation of the pigment particles and a decrease in ink density are caused during storage of the ink.

(Criterion of Dispersion Stability)

Good (A): The post-storage $D_{50}$ is less than 140 nm.

Bad (B): The post-storage $D_{50}$ is 140 nm or more.

Terms in Table 3, and Tables 4 and 5 described later are defined as follows. "EX" represents Example, and "CEX" represents Comparative Example. "Pigment composition" represents the quinacridone pigment composition. "Derivative" represents the sulfur containing pigment derivative contained in the quinacridone pigment composition. "Content percentage" represents the content percentage of the sulfur containing pigment derivative with respect to the total weight of the quinacridone pigment and the sulfur containing pigment derivative. "Discharge rate" represents the discharge rate of the bead mill in the preparation of the pigment dispersion liquid. "Sulfur concentration" represents the predetermined sulfur concentration. "Number of pass times" represents the number of performing one pass in the activated carbon treatment. The unit "wt %" represents weight percent. "Light absorbance" and "wavelength" respectively represent the predetermined light absorbance and the wavelength at the predetermined peak. "Ejection displacement" represents an evaluation result of the ejection displacement. "$D_{50}$" represents the post-storage $D_{50}$ measured in evaluation of the dispersion stability.

TABLE 3

| | | EX1 | EX2 | EX3 | CEX1 | CEX2 |
|---|---|---|---|---|---|---|
| ink | | A-1 | A-2 | A-3 | B-1 | B-2 |
| pigment composition | type | PR122-A | PR122-B | PR122-C | PR122-D | PR122-E |
| | derivative | 1-1 | 1-1 | 1-1 | 1-1 | 1-1 |
| | content percentage (wt %) | 4 | 8 | 12 | 3 | 13 |
| discharge rate (g/min) | | 300 | 335 | 350 | 310 | 315 |
| sulfur concentration (ppm) | | 1.0 | 3.2 | 5.9 | 0.4 | 6.4 |
| number of pass times | | 2 | 2 | 2 | 2 | 2 |
| predetermined peak | light absorbance | 0.15 | 0.15 | 0.15 | 0.15 | 0.15 |
| | wavelength (nm) | 425 | 429 | 431 | 423 | 433 |
| ejection displacement | | A | A | A | A | B |
| $D_{50}$ (mm) | | 132 | 120 | 110 | 140 | 107 |

As shown in Table 3, the predetermined sulfur concentration of the ink (B-1) was less than 1.0 ppm. The ink (B-1) has a post-storage $D_{50}$ of 140 nm or more, and evaluation of the dispersion stability thereof was Bad.

As shown in Table 3, the predetermined sulfur concentration of the ink (B-2) was more than 6.0 ppm. The evaluation result of the ejection displacement of the ink (B-2) was Bad.

On the other hand, as shown in Table 3, the inks (A-1) to (A-3) contained the quinacridone pigment and the aqueous medium. The predetermined sulfur concentration was 1.0 ppm or more and 6.0 ppm or less. The predetermined light absorbance was 0.17 or less. The evaluation results of the dispersion stability and the ejection displacement of the inks (A-1) to (A-3) were Good.

[Discussion 2: Predetermined Light Absorbance]

The predetermined light absorbance was discussed. In Discussion 2, the inks (A-4) to (A-6) and (B-3) were used. The inks (A-4) to (A-6) and (B-3) were prepared by the same method as the preparation of the ink (A-1), except for changing the following items. In the preparation of the pigment dispersion liquid described above, the quinacridone pigment composition (PR122-B) was used instead of the quinacridone pigment composition (PR122-A). In the preparation of the pigment dispersion liquid described above, the discharge rate of the bead mill was changed as shown in Table 4. In the activated carbon treatment, the number of pass times was changed as shown in Table 4 described later.

For the inks (A-4) to (A-6) and (B-3), the predetermined sulfur concentration, the wavelength at the predetermined peak, and the predetermined light absorbance were measured by the same method as Discussion 1 described above, and the ejection displacement and the dispersion stability were evaluated. The measurement result and the evaluation result are shown in Table 4.

TABLE 4

| | | EX4 | EX5 | EX6 | CEX3 |
|---|---|---|---|---|---|
| ink | | A-4 | A-5 | A-6 | B-3 |
| pigment | type | PR122-B | PR122-B | PR122-B | PR122-B |
| composition | derivative | 1-1 | 1-1 | 1-1 | 1-1 |
| | content percentage (wt %) | 8 | 8 | 8 | 8 |
| discharge rate (g/min) | | 320 | 305 | 310 | 320 |
| sulfur concentration (ppm) | | 3.2 | 3.2 | 3.2 | 3.2 |
| number of pass times | | 2 | 3 | 4 | 1 |
| predetermined | light absorbance | 0.15 | 0.10 | 0.05 | 0.19 |
| peak | wavelength (nm) | 429 | 429 | 429 | 429 |
| ejection displacement | | A | A | A | B |
| $D_{50}$ (nm) | | 120 | 120 | 120 | 120 |

As shown in Table 4, the predetermined light absorbance of the ink (B-3) was more than 0.17. The evaluation result of the ejection displacement of the ink (B-3) was Bad.

On the other hand, as shown in Table 4, the inks (A-4) to (A-6) contained the quinacridone pigment and the aqueous medium. The predetermined sulfur concentration was 1.0 ppm or more and 6.0 ppm or less. The predetermined light absorbance was 0.17 or less. The evaluation results of the dispersion stability and the ejection displacement of the inks (A-4) to (A-6) were Good.

[Discussion 3: Type of Sulfur Containing Pigment Derivative and Type of Quinacridone Pigment]

The type of the sulfur containing pigment derivative and the type of the quinacridone pigment were discussed. In Discussion 3, the inks (A-7) to (A-8) were used. The inks (A-7) to (A-8) were prepared by the same method as the preparation of the ink (A-1) except for changing the following point. In the preparation of the pigment dispersion liquid described above, the quinacridone pigment composition shown in Table 5 described later was used instead of the quinacridone pigment composition (PR122-A). In the preparation of the pigment dispersion liquid described above, the discharge rate of the bead mill was changed as shown in Table 5 described later.

For the ink (A-7) to (A-8), by the same method as Discussion 1 described above, the predetermined sulfur concentration, the wavelength at the predetermined peak, and the predetermined light absorbance were measured, and the ejection displacement and the dispersion stability were evaluated. The measurement result and the evaluation result are shown in Table 5.

TABLE 5

| | | EX7 | EX8 |
|---|---|---|---|
| ink | | A-7 | A-8 |
| pigment | type | PR122-F | PV19 |
| composition | derivative | 1-2 | 1-1 |
| | content percentage (wt %) | 8 | 8 |
| discharge rate (g/min) | | 310 | 315 |
| sulfur concentration (ppm) | | 3.0 | 2.8 |
| number of pass times | | 2 | 2 |
| predetermined | light absorbance | 0.14 | 0.13 |
| peak | wavelength (nm) | 430 | 427 |
| ejection displacement | | A | A |
| $D_{50}$ (nm) | | 125 | 116 |

As shown in Table 5, although sulfur containing pigment derivative or the quinacridone pigment contained in the quinacridone pigment composition is different from the inks (A-1) to (A-6), each of the inks (A-7) to (A-8) contained the quinacridone pigment. The predetermined sulfur concentration was 1.0 ppm or more and 6.0 ppm or less. The predetermined light absorbance was 0.17 or less. The dispersion stability evaluation and the ejection displacement evaluation of the inks (A-7) to (A-8) were Good.

From above discussion, the ink of the present disclosure including the inks (A-1) to (A-8), and the ink jet recording apparatus of the present disclosure using such the ink are determined to be able to suppress occurrence of the ejection displacement of ink from the recording head, and to be superior in dispersion stability of the ink.

In this way, the inkjet ink and the inkjet recording apparatus according to the present disclosure can suppress occurrence of ejection displacement from the recording head and are superior in dispersion stability.

The ink and the ink jet recording apparatus of the present disclosure can be used for forming images.

What is claimed is:

1. An inkjet ink containing quinacridone pigment and aqueous medium, wherein a sulfur concentration in 10-fold diluent of supernatant liquid obtained by centrifuging the inkjet ink at 1,050,000 G for three hours is 1.0 ppm or more and 6.0 ppm or less, and in an ultraviolet and visible ray absorption spectrum of 25-fold diluent of the supernatant liquid, light absorbance at a predetermined peak is 0.17 or less, and the predetermined peak is a maximum peak in a wavelength range of 400 nm or more and 490 nm or less.

2. The inkjet ink according to claim 1 further containing quinacridone derivative containing sulfur atoms, wherein the sulfur concentration is concentration of the sulfur atoms contained in the quinacridone derivative in the 10-fold diluent of the supernatant liquid.

3. The inkjet ink according to claim 2, wherein the quinacridone derivative is a compound expressed by formula (1):

(1)

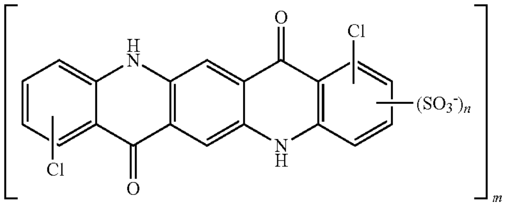

In the formula (1), n is an integer of 1 or more and 3 or less, m is an integer of 1 or more and 3 or less, and X represents a metallic ion.

4. The inkjet ink according to claim 3, wherein X represents $Al^{3+}$ or $Mg^{2+}$ in the formula (1).

5. The inkjet ink according to claim 2, wherein the content percentage of the quinacridone derivative with respect to total weight of the quinacridone pigment and the quinacridone derivative is 4 weight percent or more and 12 weight percent or less.

6. The inkjet ink according to claim 1, wherein the predetermined peak is a peak derived from a synthetic intermediate of the quinacridone pigment remaining in the quinacridone pigment.

7. The inkjet ink according to claim 6, wherein the synthetic intermediate of the quinacridone pigment is a compound expressed by formula (2):

(2)

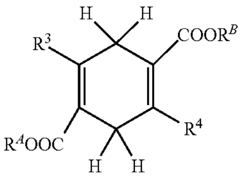

In the formula (2), $R^A$ and $R^B$ each independently represent a monovalent group, $R^3$ represents a hydroxy group or a group expressed by formula (3), and $R^4$ represents a hydroxy group or a group expressed by formula (4), (3)

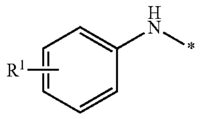

(4)

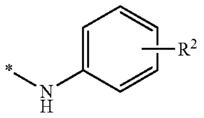

In the formulas (3) and (4), $R^1$ and $R^2$ each independently represent a monovalent group, and * in the formula (3) represents that it is bonded to a carbon atom to which $R^3$ in the formula (2) is bonded, and * in the formula (4) represents that it is bonded to a carbon atom to which $R^4$ in the formula (2) is bonded.

8. An inkjet recording apparatus comprising:

a conveying unit that conveys a recording medium; and a recording head that discharges ink to the recording medium, wherein the ink is the inkjet ink according to claim 1.

9. The inkjet recording apparatus according to claim 8, wherein the recording head is a line head.

* * * * *